United States Patent [19]
Bingley

[11] 3,743,919
[45] July 3, 1973

[54] REGULATED CYCLOCONVERTER

[75] Inventor: Donald W. Bingley, Chelmsford, Mass.

[73] Assignee: Raytheon Company, Lexington, Mass.

[22] Filed: June 14, 1972

[21] Appl. No.: 262,867

[52] U.S. Cl. ................................. 321/69 R, 321/4
[51] Int. Cl. ............................................. H02m 5/30
[58] Field of Search ...................... 321/4, 7, 9, 10, 321/47, 60, 68, 69

[56] References Cited
UNITED STATES PATENTS

| | | | |
|---|---|---|---|
| 3,302,093 | 1/1967 | Yarrow .......................... | 321/69 R X |
| 3,431,483 | 3/1969 | Lafuze .................................... | 321/7 |
| 2,721,264 | 10/1955 | Selz et al. .......................... | 321/68 X |
| 2,774,932 | 12/1956 | Patton................................... | 321/47 |
| 3,171,078 | 2/1965 | Keener................................. | 321/9 R |
| 3,247,444 | 4/1966 | Clarke et al. ............................. | 321/4 |
| 3,585,485 | 6/1971 | Gyugyi et al...................... | 321/69 R |

Primary Examiner—William M. Shoop, Jr.
Attorney—Milton D. Bartlett, Herbert W. Arnold et al.

[57] ABSTRACT

A method of utilizing a cycloconverter to achieve regulated AC power by proportional control of the high frequency waveform from a high frequency generator in such a manner that the average value of output voltage is varied to meet the required waveshape. By utilizing a reactor winding and controlling the current through it by means of a semiconductor switching arrangement, output voltage can be varied even to zero while the semiconductor switches are still conducting, thereby avoiding the requirement of waiting for nonconduction of the semiconductor switches to reduce the output voltage to zero.

12 Claims, 4 Drawing Figures

Patented July 3, 1973

REGULATED CYCLOCONVERTER

BACKGROUND OF THE INVENTION

This invention relates to converter power supplies of the type which provide a sine wave output and, more particularly, to a power supply system which utilizes a cycloconverter having switching devices which transform power at a higher frequency into such power at a lower frequency and to regulate the output of the cycloconverter by controlling the high frequency waveform of such power according to a reference waveshape.

In many power supply applications, the electric equipment forming the load frequently requires power conditioning or improved regulation of the supply line to enable optimum performance. This is especially necessary when the equipment is operated under conditions of adverse input power, where dynamically changing demand causes severe variations in input voltage stability and waveform. Power conditioning is often needed, even with reasonably good power sources, due to sophistication of the requirements imposed by modern equipment. There is also an ever-increasing need for higher reliability, which may be satisfied by providing freedom from transient high stresses imposed on the equipment by prevalent power line conditions. Presently available AC regulators or line conditioners are limited in their flexibility to provide optimum power conditions to complex and sensitive loads. SCR alternating current regulators, for example, use controlled firing of SCR's to buck or boost the line voltage to produce a regulated output of moderate distortion content. However, this method is relatively slow to recover from transients in the line or load, and is relatively large and heavy. Rotating machinery provides output power at high efficiency to high power loads. This method, however, has the inherent reliability problems of moving parts. In addition, the above systems deliver power at a single frequency and are restricted in their adjustment of delivered voltage. In order to reduce the size and weight of components, cycloconverters have been used in connection with a source substantially higher in frequency than the cycloconverter output frequency to regulate the lower frequency output by control of the cycloconverter circuit. To achieve this, the switching devices, usually SCR's, are triggered at various times during each half cycle, and usually require a shift in polarity of the input waveform to achieve control of the lower frequency output waveform. Thus, turnoff of the conducting SCR switch must await current flow being reduced to zero which requires the reversal of the incoming wave. However, in the instance of a load which incurs a lagging power factor, such as in the presence of an inductive load which maintains current flow through the SCR, reversal of the input wave frequently does not commutate the SCR during the half cycle or several subsequent half cycles, resulting in loss of control of the cycloconverter. Accordingly, it is an important object of the invention to provide an improved power supply which overcomes the above disadvantages in that it maintains control of the cycloconverter independent of its output load by rendering control of the SCR switching devices independent of their turnoff times.

It is another object of the invention to provide an improved relatively compact power supply of the character described which provides regulation for line variation with substantially no distortion of the output waveform.

It is a further object of the invention to provide an improved alternating current regulator which achieves accurate regulation of the output voltage by responding to line and load transients at a frequency faster than the output frequency. Still another object of the invention is to provide an alternating current regulator in which the output waveform can be regulated and the output amplitude is variable from zero to full output without distortion, by means of low signal control circuits.

SUMMARY OF THE INVENTION

In accordance with the cycloconverter circuit of the invention, power at a higher frequency than the prime power is generated, such as in a conventional inverter circuit, the high frequency output of which is coupled such as by a transformer to the regulated cycloconverter circuit. A center tapped choke or spanning reactor is switched by four switches, such as SCR's, first in one direction and then in the other direction across, for example, the secondary winding of the transformer which is also center tapped to provide in connection with the center tap on the choke a pair of output terminals for the cycloconverter. One of the switches is connected between each end of the secondary winding and its corresponding end of the center tapped choke, the other two switches being cross-coupled, one from each end of the secondary winding to the opposite ends of the center tapped choke. The conduction and nonconduction of the switches are programmed by a separate source of gate or switching pulse signals to provide at the center tapped output terminals a low frequency sine wave output wave which can be connected to a low pass filter. By programming the serially-connected switches to conduct, and then the cross-coupled switches to conduct, the center tap of the choke is brought to zero voltage. At other times, the center tap of the choke will be "high" and the corresponding programmed switches for providing this condition remain conducting only as long as the current built up in the choke, during the time it was connected across the transformer secondary and the load circuit, stays above the holding current for these switches. By producing zero voltage at the center tap of the choke, in the novel manner described, it becomes evident that the currently conducting switch need not "turn off," consequently, output voltage control can be achieved, regardless of the load current condition, and without the inherent commutation delay of other cycloconverters. Thus, since the switches, such as SCR's, need not turn off at the usual commutation times, the load power factor cannot adversely affect the circuit's operation. In one embodiment, the alternating voltage output is compared with a low level AC reference signal of desirable waveshape and the deviations from the reference waveshape are corrected at the high frequency input wave rate which enables the output waveform to be controlled actively by regulation of the cycloconverter to compensate for potential waveform distortion that is frequently caused by the application of rectifier or "switching" type loads. Also, by variation of the AC reference signal by means of a simple low level potentiometer, the output of the circuit can be controlled from zero volts to full output, without incurring distortion of the output waveform.

BRIEF DESCRIPTION OF THE DRAWINGS

For a better understanding of the present invention, together with other and further objects thereof, reference is made to the following description taken in connection with the accompanying drawings, in which.

DESCRIPTION OF THE PREFERRED EMBODIMENT

Figure 1:
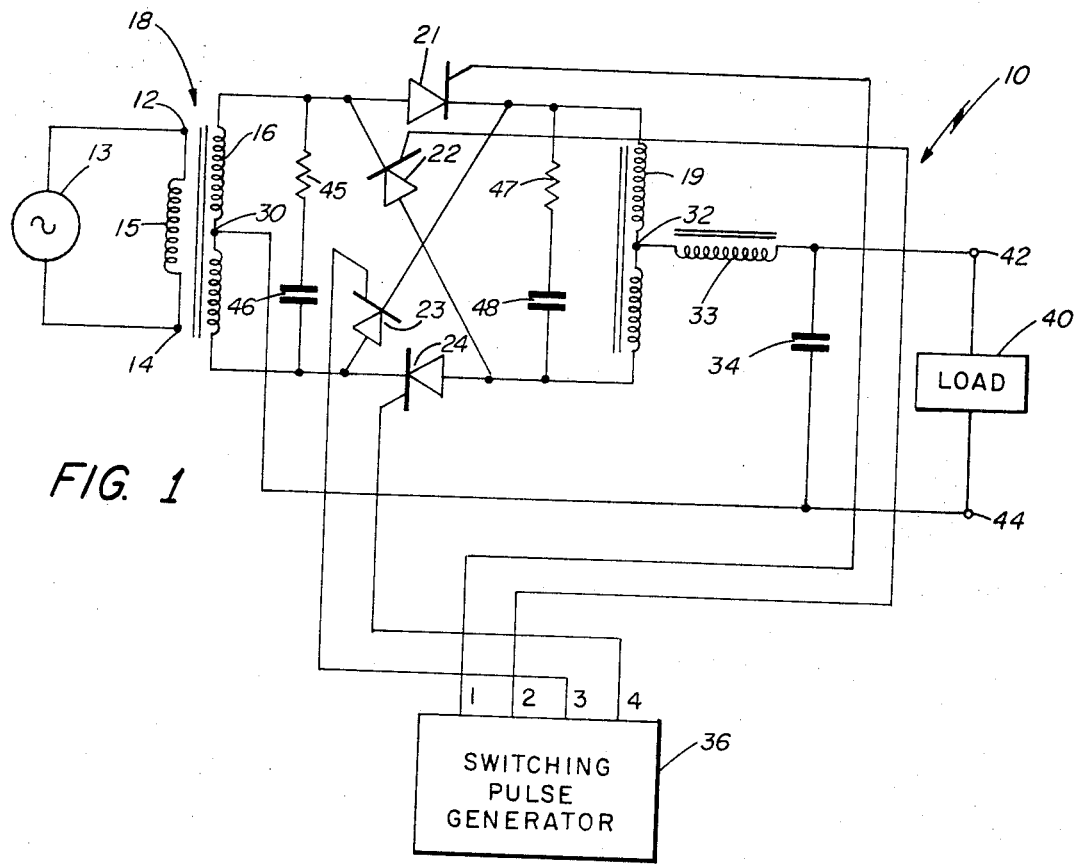
FIG. 1 is a schematic diagram of a cycloconverter power supply circuit embodying features of the invention.
Figure 2:
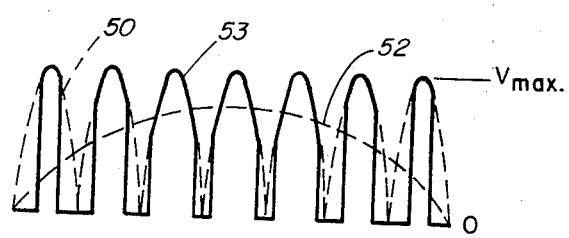
FIGS. 2 and 3 are curves showing the characteristics of the input waveform, an idealized output voltage at the center tap of the cycloconverter choke or reactor winding and the firing sequence to provide a positive and negative output.

Referring now to FIG. 1, there is shown a cycloconverter circuit 10 having a pair of input terminals or nodes 12 and 14 adapted to receive a high frequency current source of approximately 10 kilohertz, such as shown in FIG. 2, as provided by high frequency generator or source 13. Connected to terminals 12 and 14 is a primary winding 15 which with center tapped secondary winding 16 is wound on a common magnetic core of a conventional transformer 18 having, for example, a 1 to 2 step-up ratio. This transformer steps up the voltage to a value as required by the load. Connected across the secondary winding 16 is a center tapped inductor or choke 19 by means of serially-connected switches, herein shown as SCR's 21 and 24, which conduct to connect the choke in one direction, and switches, herein shown as SCR's 22 and 23, which are cross coupled as shown and conduct to connect the choke in the opposite direction across secondary winding 16, as will be described. The SCR's can be, for example, type C141. A low frequency output for the cycloconverter is developed across terminals 30 and 32 which are the center taps, respectively, for the transformer secondary and the choke. This low frequency output is filtered by a conventional choke 33 and capacitor 34 before its application to a load 40 connected across output terminals 42 and 44.

In order to provide a voltage conversion at a high frequency, for example, 20 kilohertz, gating pulses at discrete intervals are applied from a gate or switching pulse generator 36 to the control electrode of each silicon controlled rectifier. FOr each half cycle of input voltage, as seen in FIG. 2, the SCR's, for illustrative purposes in the present embodiment, are pulsed to conduct at twice the source frequency. The switching voltage for SCR 21, for example, is applied between its cathode and control electrode by means of a conventional isolation transformer, not shown, in the switching pulse generator 36 and having an individual output line 1 connected to SCR 21. In like manner, silicon controlled rectifiers 22, 23 and 24, respectively, are gated into conduction by gating pulses from respective output lines 2, 3 and 4 of pulse generator 36 by way of individual isolation transformers, not shown, in switching pulse generator 36. It should be understood that isolation transformers having separate secondary windings can be used or other winding arrangements can be used to provide isolation in a well-known manner. To suppress ringing due to transformer leakage inductance when the SCR's turn on and off, an RC filter circuit comprising resistor 45 and capacitor 46 are connected in series across the output of the transformer secondary winding 16. To suppress ringing in inductance 19 a conventional RC filter comprising resistor 47 and capacitor 48 are connected in series across inductance 19, the RC circuit having a time constant which is made long with respect to the ringing frequency of the inductor and its stray capacitance in a well-known manner.

In operation, the cycloconverter proportionally controls the high frequency input waveform 50 in FIG. 2 in such a manner that the average value of the output wave 52 is dependent upon the amplitude of the voltage from the high frequency source, such as an inverter, and upon the cycloconverter SCR conduction angles. The output of the cycloconverter is zero when all four SCR's are triggered simultaneously. In this embodiment, this triggering point is typically near the peak of the incoming waveform 50, where the offset or point from which the conduction point for each pair of SCR's 21, 23 and 22, 24 converge and diverge with respect to the zero crossing point of the incoming wave 50. The offset is equal to 90°; that is, conduction of the SCR's does not occur until this point is reached. This provides a negative DC bias in which there is no DC path for negative current so as to prevent undesirable positive DC current which flows through the transformer and spanning reactor or choke 19 as a result of positive bias when the offset or SCR firing angle is less than 90°. To achieve this preferred operation, the switching pulse generator 36 contains well-known circuitry for starting the triggering sequence at 90° from the zero crossing of the incoming wave as well as the order of firing for the four SCR's.

The polarity low frequency output voltage waveform 52, which is the mean or average voltage of voltage 53 at point 32, is determined by the sequence of triggering of the SCR pairs. For simplicity, the SCR's can be triggered in pairs, the odd and even SCR's being the related ones; namely, SCR's 21, 23 and 22, 24 corresponding to lines 1, 3 and 2, 4.

When SCR's 21 and 24 or 22 and 23 have been triggered into conduction, center tapped choke 19 is connected across the secondary winding of transformer 18 which has the effect of bringing the center tap 32 to zero voltage with respect to tap 30 as shown in FIG. 2. The voltage at the center tap of choke 19 shown by waveform 53 is at zero, as shown in FIG. 2. The inductance of choke 19 then limits the circulating current rise due to the secondary voltage. By producing zero voltage at the center tap of choke 19, the voltage across taps 32 and 30 is zero and the currently conducting SCR's 21 and 24 or 22 and 23 need not turn off. Consequently, output voltage control can be achieved, regardless of load current condition.

When SCR's 21 and 22 or 23 and 24 are programmed to conduct, the center tap of choke 19 will be "high" as shown at the voltage maximum, $V_{max}$, of waveform 53 of FIG. 2. At this point SCR's 22 and 23 remain conducting only as long as the current built up in choke 19, during the time it was connected across secondary winding 16, stays above the holding current of the SCR's. However, this period to cut off the SCR's need not be shorter than the half cycle in which the conduction was initiated because the subsequent half-cycle of voltage from secondary 16 is of opposite polarity and does not affect the conducting pair of SCR's. Accordingly, the power factor does not adversely affect the circuit's operation. The maximum voltage across the choke 19 occurs when the cycloconverter output is zero, namely, when the voltage between the center tap of choke 19 and the center tap 30 is zero. At this time the full secondary voltage is impressed across the choke and its frequency, for example, equals 20 kilohertz which is twice the frequency of generator 13.

In a cycle of operation, to achieve a positive DC output for the waveform 52, for example, a trigger pulse on lines 1 and 3 will render SCR 21 or 23 into conduction depending on the polarity of the input voltage from the secondary 16 at that time. This will produce a positive voltage at center tap 32 either by SCR 21 conducting on the positive half cycle, or SCR 23 conducting on the negative half cycle of the input voltage from secondary 16. As the positive half cycle, for example, progresses, SCR 22 which was previously conducting can become nonconducting within its natural period. However, SCR 21 will still conduct as long as current continues to flow through it due to current in the choke and the load. This provides output power independently of the nonconducting point of SCR 22. During the positive half cycle, SCR's 22 and 24 are triggered, and SCR 24 will conduct at point $a$ on curve 52 of FIG. 3. The center tap 32 will now go to zero because SCR's 21 and 24 are now conducting as previously described. Both SCR's 21 and 24 remain conducting at the end of the positive half cycle due to current flow in the choke 19. At point $b$ on waveform 52 of FIG. 3, the negative half cycle, not shown, has commenced and a trigger on lines 1 and 3 now causes SCR 23 to conduct. Thus, when SCR 23 turns on due to the negative cycle, SCR 21, which is reverse biased, turns off in its normal recovery time. Turn off of SCR 21 does not occur as long as current is flowing through it due to the choke and load. When SCR's 23 and 24 or SCR's 23 or 24 become conducting during the negative cycle in response to triggers on lines 3 and 4, center tap 32 will be high. During the positive half cycle SCR's 21 and 22 or SCR 21 or SCR 22 conduct to make center tap 32 high.

Turning on SCR 22 or 24 brings center tap 32 to zero potential. When SCR 22 or SCR 24 turns off due to current through them falling below their holding current, SCR 23 or SCR 21 is still conducting, since there is still current flowing in the choke. At this time, SCR 21 or SCR 23 is reverse biased, causing the voltage at the center tap of the choke to go negative. The excess energy in choke 19 is at this time being returned to the high frequency generator 13.

Figure 3:
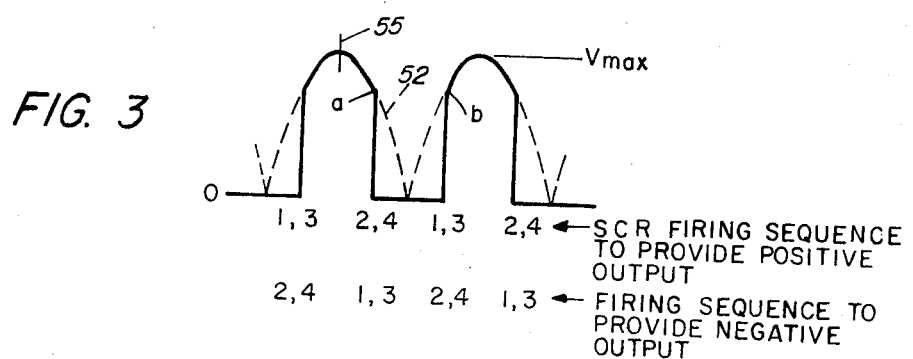

The 90° point is shown in FIG. 3 at the peak, $V_{max}$, of the input wave 52 which has been redrawn to depict in a clear manner the operating point 55. The triggering point of the SCR pairs diverge at an equal rate from this point which is near the peak of the incoming voltage waveform, to increase the output voltage, that is, the trigger delay of one pair of SCR's will decrease and the other pair will increase. The pair of SCR's that has the least delay, determines the output voltage polarity.

For example, in this embodiment, when SCR 22 and SCR 24 fire before SCR's 21 and 23 a negative output at terminals 30 and 32 results. When SCR's 21 and 23 precede SCR's 22 and 24, a positive output results since conduction of SCR's 21 and 23 connect the choke 19 across the transformer secondary 16. Also, when the firing of these SCR's is offset 90° from the zero crossing line, a balanced AC voltage results across the choke 19. Accordingly, FIG. 2 shows the output waveform 52 and superimposed input waveform 50 together with the SCR firing sequence (shown in FIG. 3) to provide a positive output, that is, triggering lines 1, 3 before lines 2, 4. When lines 2, 4 before lines 1, 3 are triggered, a negative output results. Thus, lines 1 and 3 are advanced with respect to the center point 55 of 90°, and trigger lines 2 and 4 are delayed with respect to center point 55 in FIG. 3 to increase the positive output voltage.

Figure 4:
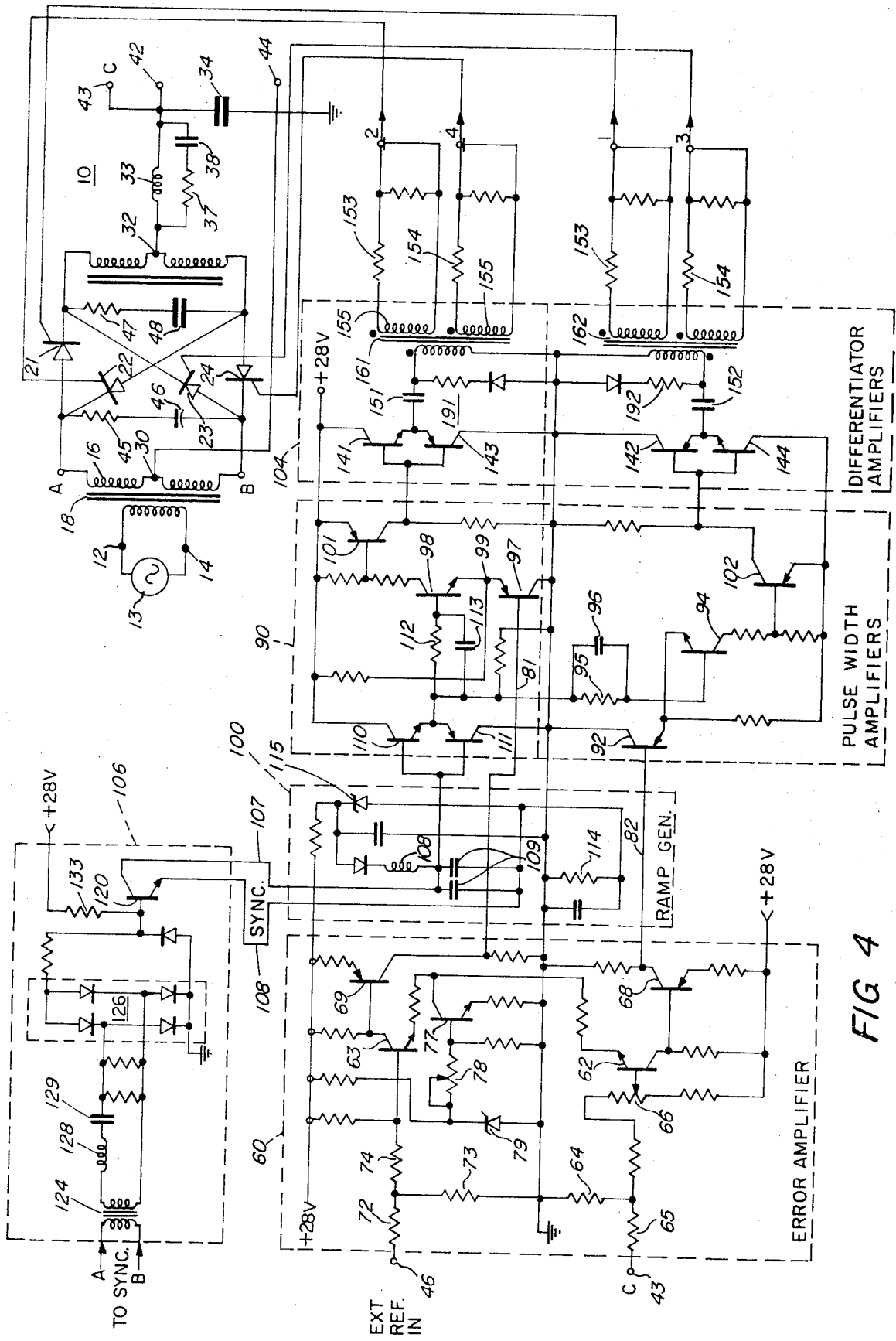
FIG. 4 is a schematic circuit in accordance with the form of the invention shown in FIG. 1 but with added details.

FIG. 4 is a complete detailed schematic circuit of a power supply having the form of FIG. 1 and including circuit details of one form of gate or switching pulse generator for providing trigger pulses to control the firing times of the SCR's in the cycloconverter. In this circuit corresponding parts bear the same numbers. Since the operation of the circuit of FIG. 4 will thus be clear from the above description of FIG. 1, only the detailed means for providing a series of trigger pulses and their connection to the SCR switches will be described in detail. In particular, a high frequency generator or source 13, herein shown as 115 volts, 10 kilohertz, is connected to cycloconverter 10 by way of input terminals 12 and 14. The triggers for the four SCR's 21, 22, 23 and 24 are supplied by the cycloconverter control circuitry in a manner such that the fundamental output at terminals 32 and 30 is formed into a shape that is determined by the reference waveform at terminal 46. The function of the low pass filter comprising choke 33 and capacitor 34 is to attenuate the 20 kilohertz switching frequency ripple of the cycloconverter. The configuration is basically an LC filter with a "cut off" at approximately 1 kilohertz. A series-connected RC circuit including resistor 37 and capacitor 38 is connected across the choke 33 to provide a lead to the normal phase shift through the LC filter to improve regulation and response time.

Referring now to FIG. 4 there is shown the circuit for providing the individual trigger signals for the cycloconverter together with the means for sensing the output voltage and delaying the triggers with respect to each other to provide a regulated output voltage at terminals 42 and 44. To achieve regulation, an error amplifier 60 includes a differential amplifier which has a pair of transistors 62 and 63 for amplifying, at one input, variations in the output voltage sensed across output terminals 42 and 44 of FIG. 4 and fed by way of line 41 and terminal 42 of FIG. 4 to terminal 43 at the input of the error amplifier. This sampled output voltage at terminal 43 is introduced into one input of the differential amplifier through divider resistors 64 and 65 and by way of a direct current balance potentiometer 66 to the base of transistor 62.

Also applied to the error amplifier 60 is a reference voltage or waveform at terminal 46 of a shape which is intended to be produced at the output of the power supply. This reference voltage is connected to external terminal 46 and fed through a voltage divider including resistors 72 and 73, and coupling resistor 74 to the base of transistor 63 at the other input of the differential amplifier. Transistor 77 and potentiometer 78 provide a means for setting the direct current output level for the error amplifier and thus the offset from the zero crossover level at which the four SCR's in the cycloconverter commence conducting. Diode 79 provides a reference voltage for the base of transistor 77. The direct current balance of the error amplifier is adjusted in a well-known manner by potentiometer 66 in the input of transistor 62. The outputs of the differential amplifier transistors 62 and 63 are amplified, respectively, by transistors 68 and 69. These outputs, inverted at transistor 68 and noninverted at transistor 69 with respect to the input reference signal, are then introduced into the pulse width amplifiers by way of line 81 which is fed by transistor 69 and line 82 which is connected to transistor amplifier 68.

The pulse width amplifier circuit 90 includes high gain transistor amplifiers which compare the signal level from error amplifier 60 with a ramp from voltage ramp generator 100 as will be described. When the inverted error signal on line 82 and the noninverted error signal on line 81 are equal, all cycloconverter SCR's of FIG. 4 are triggered simultaneously. The relative delay when this occurs will be dependent on the ramp level of that time. Mid ramp will represent 90° delay, for example, as previously described with reference to the center point 55 of FIG. 3.

In particular, the inverted error signal on line 82 is connected to the base of transistor 92, the output of which controls the emitter voltage of transistor 94. Comparator transistor 94 has applied to its base a signal from ramp generator 100. Transistor 94 compares the level of the ramp signal applied to its base with its emitter voltage from transistor 92 such that comparator transistor 94 switches when its base voltage exceeds the reference level of voltage on its emitter. At the same time, the error signal on line 81 is applied to the base of transistor 97, the emitter output of which is compared by comparator transistor 98 with the level of the ramp voltage at its base to provide the desired output direct current level at point 99. The level, as set at point 99, determines the level with respect to the ramp voltage at which the comparator transistor 98 will switch. This point determines the amount of delay of the trigger point for SCR 22 and 24 with respect to the input waveform or 10 kilohertz from secondary 16 to synch terminals A and B. The output voltage of comparator transistors 98 and 94 drives the bases of transistors 101 and 102, respectively, which in turn provides the drive voltage for differentiation amplifier 104.

When the level of the ramp generator applied to the base of comparator transistor 98 is higher than the error signal output at node 99, the output of the pulse width amplifier transistor 101 is high. When the ramp voltage is lower than the error signal, the pulse width amplifier transistor 101 output is low. In the same manner, the inverted signal on 82 applied through transistor 92 to the emitter of transistor 94 is compared to the ramp waveform and when the ramp voltage at the base of transistor 94 is greater than its emitter voltage, pulse width amplifier transistor 102 output is high. When the ramp voltage is lower than the error signal at the emitter of transistor 94, the pulse width amplifier transistor 102 output is low. The circuit is adjusted in a known manner such that there is always an excursion from low to high from the pulse width amplifiers during a ramp period. The ramp period is synchronized to the half cycle time of the input frequency as seen in FIG. 2. Consequently, there is an output from the pulse width amplifiers of two signals each half cycle.

It is evident that the higher the level of the error signal represented by the DC-bias provided by the emitter of transistor 97 to point or node 99, the greater will be the delay from the beginning of the ramp to the time the associated amplifier will conduct. Conversely, at lower levels of error signal, the delay is less. This action provides the variation of the cycloconverter SCR triggering point for SCR 22 and 24 with respect to the incoming inverter waveform. Similarly the same action will be evident for SCR 21 and 23 triggering caused by the inverted reference signal. All SCR's are triggered simutaneously when the noninverted error signal and inverted error signal on lines 81 and 82, respectively, are equal; and the relative delay is dependent on the ramp bias level at that time. Mid ramp, for example, represents 90° delay. Adjustment of the ramp bias level therefore affords setability of this point, which is preferably set somewhat higher than 90°, that is, the point at which all SCR's are triggered is slightly higher than the ramp midpoint to insure that the aforementioned undesirable positive bias current does not flow in the SCR circuitry.

Referring to FIG. 4 the ramp generator circuit 100 and its associated zero crossing detector circuit 106 is now described. In particular, the ramp is generated by an LC circuit including inductance 108 and capacitor 109, ringing for one half cycle of its resonant frequency. The ringing is excited by discharge of capacitor 109 from a signal out of the zero crossing detector 106, synchronizing the ramp to the zero crossing point at the inverter frequency by way of lines 107 and 108.

The ramp waveshape is cosinusoidal, and is the compliment of the cycloconverter output transfer characteristic which, therefore, linearizes the loop response. The ramp voltage across the ramp capacitor 109 is isolated by complimentary follower transistors 110 and 111, their common output of which is fed to the base of transistor 98 by way of a coupling circuit comprising a serially-connected resistor 112 shunted by capacitor 113 and the base of transistor 94 by a corresponding circuit consisting of resistor 95 and capacitor 96. The ringing frequency for inductance or coil 108 and capacitor 109 is preferably the same or slightly higher than the high frequency input to the cycloconverter from generator 13. The ramp is biased from ground by the voltage across a bias resistor 114 caused by current through the ramp generator circuit. This bias ensures that there will be triggers to the cycloconverter at overdrive condition. Zener diode 115, effectively connected across the ramp LC circuit, determines the amplitude of the ramp voltage fed to the base of complimentary follower transistors 110 and 111.

The zero crossing detector 106 is for the purpose of resetting the ramp to begin its upward trend, each time the input from generator 13 of FIG. 4 crosses zero and thus provides an accurate time base for synchronizing the cycloconverter control circuit to the 10 kilohertz input wave from the high frequency generator 13. This is achieved by reducing the voltage across zero crossing detector transistor 120 to zero for approximately 2 to 3 microseconds. This discharges the ramp capacitor 109 by placing a short across it by way of lines 107 and 108 and conducting transistor 120. The ramp capacitor discharges and then starts charging at the end of the 2 to 3 microsecond period. A synchronization voltage is applied to terminals A and B of the zero crossing detector. This synchronization voltage is taken from the secondary 16 of transformer 18. In this embodiment, the secondary voltage of transformer 124 is stepped down 10:1 and rectified in a conventional full wave bridge 126. To remove filter spikes that could cause false zero crossing signals, an LC filter comprising inductance 128 and capacitor 129 is tuned to the frequency of generator 13.

The unfiltered negative output of full wave bridge 126 back biases the drive being applied to transistor 120 through resistor 133 until the voltage out of the bridge approaches zero, at zero crossing, which occurs twice per cycle. Transistor 120 is then turned on for approximately 2 to 3 microseconds before being back biased once more.

In operation, the length of time required to reset the ramp capacitor 109, that is, the length of time transistor 120 in the zero crossing detector is required to conduct, is determined by its base drive current, its current gain, and the charge on capacitor 109. The minimum reset time is that time required to discharge ramp capacitor 109, while, preferably, the maximum reset time is not greater than 10 percent of the ramp period. The triggering of the cycloconverter is adjusted as previously described so as not to commence until approximately 90° after zero crossing by the incoming high frequency signal. Full excursion of the ramp represents a 180° variation of the cycloconverter SCR triggers. Therefore, reference voltage variation of terminal 46 equal to the ramp peak-to-peak voltage provides full excursion of the output voltage.

Referring again to FIG. 4 the pulse width amplifier transistors 101 and 102 are high gain amplifiers which switch into full condition when the ramp generator voltage exceeds that of the error amplifier output. The differentiator amplifier circuit 104 includes differentiating amplifiers in the form of complimentary follower transistors 141, 143 and 142, 144 driven respectively, by pulse width amplifier transistors 101 and 102. These differentiating amplifiers differentiate the positive going edge from the pulse width amplifiers. The differentiating capacitors are capacitors 151 and 152. Resistors 153 and 154 in each secondary winding 155 of SCR trigger and isolation transformers 161 and 162 form the differentiating resistor for their associated capacitors 151 and 152. The output lines 1, 2, 3 and 4 of these pulse transformers are connected respectively to the corresponding gate or control electrodes of transistors 21, 22, 23 and 24. In this manner, each individual SCR receives a trigger pulse which is isolated from the remaining trigger pulses and at the same time transformers 161 and 162 have a polarity such that either output lines 2 and 4 or lines 1 and 3 are energized together to cause conduction of either SCR's 21 and 23 or 22 and 24 for accurate regulation of the cycloconverter output. The inverted output over line 82 is amplified and coupled to transformer 162, and in like manner, the inverted output on line 81 is coupled to transformer 161 and SCR trigger lines 2 and 4. Resistors 191 and 192 and their associated diodes reset the voltage on differentiating capacitors 151 and 152, respectively, thus readying the primary of transformers 161 and 162 for the next SCR trigger pulse.

From the above description and drawings it will be evident that a novel power supply circuit has been described that can achieve a zero output even when the silicon controlled rectifiers are conducting, thus providing an important capability of controlling the circuit operation in the presence of a reactive load where heretofore nonconduction of the SCR's was normally required for zero output. The voltage therefore in the present circuit may be at zero even though the current through the accompanying reactor may not be at zero, thus providing a flexibility of operation heretofore not obtained. Accordingly, the foregoing disclosure and drawings are merely illustrative of the principles of the invention and are not to be interpreted in a limiting sense. The only limitations will be determined by the scope of the appended claims.

I claim:

1. A power supply including a high frequency generator for producing alternating current in excess of the frequency of a prime power source, a cycloconverter circuit coupled to said high frequency generator and comprising a transformer having a primary winding and a center tapped secondary winding providing an output terminal, a reactor having its winding center tapped to provide another output terminal, a first pair of SCR's having one coupled from each end of the secondary winding to a corresponding end of said reactor, a second pair of SCR's having one coupled from each end of said secondary winding to the opposite end of said reactor, means for switching the polarity of said reactor for providing a zero output signal across the center tapped output terminal of said reactor and the center tapped output terminal of said transformer notwithstanding continued conduction of said first pair and said second pair of SCR's, and means for progressively triggering said first pair and said second pair of SCR's in excess of the frequency of said high frequency generator in response to a reference voltage waveshape to program current flow through said reactor from said secondary winding thereby to provide across said output terminals a lower frequency output which conforms to the waveshape of said reference voltage.

2. A regulated power supply including a cycloconverter circuit comprising a transformer having a primary winding adapted to be connected to a high frequency source, a secondary winding center tapped to provide a first output terminal, a reactor winding center tapped to provide a second output terminal, a first pair of semiconductor rectifiers having one coupled from each end of said secondary winding to a corresponding end of said reactor winding, a second pair of semiconductor rectifiers having one coupled from each end of said secondary winding to the opposite end of said reactor winding and poled in a manner to provide zero output voltage across said first and second output terminals notwithstanding current flow through said reactor winding in response to conduction of said first pair and said second pair of semiconductor rectifiers, a source of reference voltage, and means in response to said reference voltage to trigger said first pair and said second pair of semiconductor rectifiers with respect to said high frequency source to provide at said first and second output terminals a replica of said reference voltage at a lower frequency than said high frequency source.

3. A regulated power supply including a cycloconverter circuit comprising a transformer having a primary winding adapted to be connected to a high frequency source, a secondary winding center tapped to provide a first output terminal, a reactor winding center tapped to provide a second output terminal, a first pair of semiconductor rectifiers having one connected from each end of said secondary winding to a corresponding end of said reactor winding, a second pair of semiconductor rectifiers having one coupled from each end of said secondary winding to the opposite end of said reactor winding, said first pair and second pair of semiconductor rectifiers poled in a manner to provide unidirectional current flow through said reactor winding in a direction to provide a zero output across said first and second output terminals determined by the order of conduction of said first pair and said second pair of semiconductor rectifiers, means to trigger said first pair and said second pair of semiconductor rectifiers to provide at said output terminals an output voltage at a lower frequency than said high frequency source, and means in response to said output voltage to provide a control voltage to trigger said first pair and said second pair of semiconductor rectifiers in a sequence to regulate said output voltage with respect to variations in said high frequency source.

4. A power supply including a cycloconverter circuit adapted to be connected to a high frequency source, a transformer having a center tapped secondary winding inductively coupled to said high frequency source, a reactor winding center tapped to provide an output terminal, a first pair of semiconductor switches having one in circuit with each end of said secondary winding and a corresponding end of said reactor winding, a second pair of semiconductor switches having one coupled from each end of said secondary winding to the opposite end of said reactor winding, means for initiating conduction in said first pair and said second pair of semiconductor switches at a frequency in excess of the frequency of said high frequency source and independently thereof to provide in said reactor winding current flow providing an output voltage at the center tap of said reactor winding, nonconduction in said first pair and said second pair of semiconductor switches occurring during their natural recovery period whereby a variable load connected between the center tap of said reactor winding and the center tap of said secondary winding does not affect the commutation of any pair of semiconductor switches.

5. A regulated power supply including a cycloconverter circuit comprising a transformer having a primary winding adapted to be connected to a high frequency source, a secondary winding center tapped to provide a first output terminal, a reactor winding center tapped to provide a second output terminal, a first pair of SCR's having one coupled from each end of said secondary winding to a corresponding end of said reactor winding, a second pair of SCR's having one coupled from each end of said secondary winding to the opposite end of said reactor winding, means for sensing voltage variations across said output terminals, means in response to said voltage variations to provide a control signal to vary the order of conduction of said SCR's in a manner to provide at said output terminals a voltage independent of the termination of conduction of said SCR's which is compensated for voltage variation in said high frequency source.

6. A cycloconverter comprising a transformer having a secondary winding coupled to a high frequency source, and center tapped to provide a first output terminal, a spanning reactor adapted to be fed by said secondary winding and center tapped to provide a second output terminal, a first pair of semiconductor switches having one coupled from each end of said spanning reactor to a corresponding end of said secondary winding, a second pair of semiconductor switches having one coupled from each end of said spanning reactor to the opposite end of said secondary winding, said first pair and said second pair of semiconductor switches polarized to provide a current flow in said spanning reactor to provide a zero output across said first and second output terminals notwithstanding continued conduction in either said first pair or said second pair of semiconductor switches, means for sensing the output voltage across said output terminals, means for comparing said sensed voltage with a reference voltage to provide a control voltage, means in response to said control voltage to trigger said first pair and said second pair of semiconductor switches in a predetermined sequence to proportionally control current flow from said high frequency source into said spanning reactor to reproduce at said output terminals an output waveform at a lower frequency than said high frequency source and having the shape of said reference waveform.

7. A cycloconverter as set forth in claim 6 in which said first pair and said second pair of semiconductor switches are SCR's and are polarized to remain conducting during a portion of their operating cycle during zero output voltage from said first and second output terminals.

8. A power supply including a cycloconverter circuit adapted to be connected to a high frequency source, a transformer having a center tapped secondary winding forming an output terminal and inductively coupled to said high frequency source, a reactor winding center tapped to provide a second output terminal, a first pair of semiconductor switches having one in circuit with each end of said secondary winding and a corresponding end of said reactor winding, a second pair of semiconductor switches having one coupled from each end of said secondary winding to the opposite end of said reactor winding, and means to trigger said first pair and said second pair of semiconductor switches in a sequence which permits current flow in said reactor winding independent of termination of conduction of said semiconductor switches, whereby said output voltage at said output terminals is independent of the recovery time of said semiconductor switches.

9. A regulated power supply including a cycloconverter circuit comprising a transformer having a center tapped secondary winding adapted to be inductively coupled to a high frequency source, a first pair of semiconductor switches, a center tapped reactor winding each end of which is coupled in series with a corresponding end of said secondary winding by means of one semiconductor switch of said first pair of semiconductor switches, a second pair of semiconductor switches having one coupled from each end of said secondary winding to the opposite end of said reactor winding, means for causing conduction in a predetermined sequence in said first pair and said second pair of semiconductor switches to provide an output voltage across output terminals formed by said center tapped reactor winding and said center tapped secondary winding which is independent of the recovery time of said semiconductor switches, whereby zero output voltage across said output terminals occurs during alternate conduction of said first pair and said second pair of semiconductor switches.

10. The cycloconverter circuit as set forth in claim 9 in which predetermined ones of said first pair and said second pair of said semiconductor switches are rendered conducting to control the direction of current flow in said reactor winding.

11. A cycloconverter circuit for providing a regulated output voltage independently of the time of conduction of semiconductor switches in the output circuit of said cycloconverter comprising a secondary winding inductively coupled to a source of high frequency, a reactor winding, a first pair of semiconductor switches having one coupled from each end of said reactor winding to said secondary winding in a manner adapted to control the flow of current through said reactor winding, a second pair of semiconductor switches having one coupled from each end of said secondary winding to the opposite end of said reactor winding, and means for regulating the conduction of said first pair and said second pair of semiconductor switches and current flow in said reactor winding for providing a zero output voltage at said output circuit notwithstanding conduction of said first pair and said second pair of semiconductor switches.

12. A cycloconverter circuit as set forth in claim 11 in which means is provided for sensing the output of said cycloconverter circuit and controlling the conduction sequence of said first pair and said second pair of semiconductor switches to provide a regulated output voltage.

* * * * *